No. 865,818. PATENTED SEPT. 10, 1907.
W. H. POWELL.
SYSTEM OF MOTOR CONTROL.
APPLICATION FILED JAN. 28, 1907.
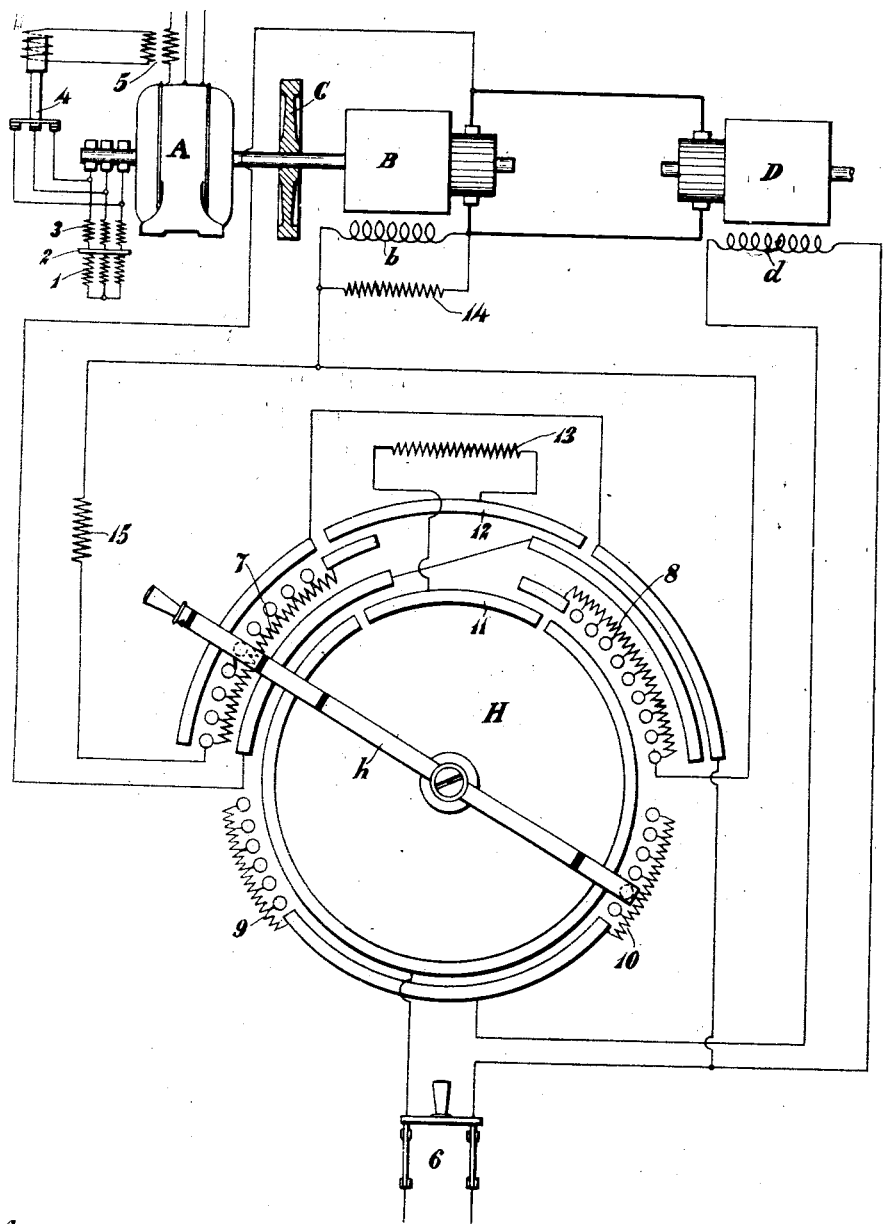

UNITED STATES PATENT OFFICE.

WILLIAM H. POWELL, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

SYSTEM OF MOTOR CONTROL.

No. 865,818.

Specification of Letters Patent.

Patented Sept. 10, 1907.

Application filed January 28, 1907. Serial No. 354,503.

*To all whom it may concern:*

Be it known that I, WILLIAM H. POWELL, a citizen of the United States, residing at Norwood, in the county of Hamilton and State of Ohio, have invented certain new and useful Improvements in Systems of Motor Control, of which the following is a full, clear, and exact specification.

My invention relates to motor control systems and especially to control systems for motors requiring great variations in speed in minimum time.

Systems of motor control have been proposed in which the motor is controlled in speed and direction by varying the value and direction of the electromotive force of the generator supplying said motor. In all of these it has been necessary to obtain all or the greater part of the excitation of the generator from a separate source, as the electromotive force of a purely self-excited generator having a constant direction of rotation is ordinarily not reversible. Other systems have been proposed in which the working motor is controlled by varying the value only of the electromotive force of the generator supplying said motor, the reversal of the motor being obtained by means of a reversing switch between its armature and the main generator. In these systems it is possible to have a purely self-excited generator for supplying such motor, but it may sometimes be objectionable to have a reversing switch in the motor armature circuit.

It is the object of my invention to provide a system in which the speed and direction of rotation of the motor is controlled by varying the value and direction of the electromotive force of a generator which is practically fully self-excited, the reversal of the electromotive force of this generator being obtained by reversing its residual magnetism.

My invention therefore broadly comprises the method of controlling a generator which consists in determining the polarity of its field in either direction as desired by current from a separate source, and in further exciting its field by current from its own armature.

More specifically my invention comprises a system of motor control consisting of a motor, a main generator for supplying the armature of said motor, said generator being practically self-excited, a separate source of current, and a controller for varying the field excitation of said generator and for connecting said separate source of current to reverse the residual magnetism of said generator.

Other features of my invention will appear from the following description and accompanying drawings and will be particularly pointed out in the claims.

The single figure of the drawing shows diagrammatically one embodiment of my invention.

In this figure, A is an electric motor of the three-phase induction type, though obviously other forms of motors could be used instead. In the rotor circuit of this motor is a starting resistance 1 adjustable by means of a short-circuiting bar 2, and a regulating resistance 3 arranged to be cut in and out by a solenoid switch 4, which in turn is responsive to the current strength of the primary circuit of the motor as through a series transformer 5. Other means for varying the speed of motor A may be used if desired. A generator armature B is driven by the motor A, being preferably directly connected thereto, and on the common shaft of the motor A and the generator B is a heavy fly wheel C. The generator B supplies current to the armature D of the working motor. The motor D may be used to drive any desired machinery.

The field windings $d$ of the working motor are supplied from any direct current source through a switch 6. The field windings $b$ of the generator B are supplied jointly from the same direct current source and the armature B of the main generator in series. The two coils $b$ and $d$ are controlled by a main controller H which is arranged to vary the resistance in circuit respectively with these two field coils and to reverse the current in the coil $b$. The arm or handle $h$ of this controller is divided into several electrically distinct parts. There are two sets of variable resistance, one set of which, resistances 7 and 8, is for the field circuit of the generator, and the other set, resistances 9 and 10, for the field circuit of the working motor.

If desired, instead of having the resistances 7 and 8 separate, the contacts of one may be connected to the corresponding contacts of the other, one of these resistances being omitted. The same cross connection may be applied to the contacts of the resistances 9 and 10.

The controller is arranged so that when its arm $h$ is moved on one side of the vertical the resistances 7 and 10 are varied to control the speed of the motor D in one direction, and when moved on the other side of the vertical the resistances 8 and 9 are varied to control the motor D in the other direction. The direction of current through the coil $b$ is reversed as the arm $h$ passes through its vertical position, at which time the electromotive force of the generator B is at or near a minimum and substantially the full exciting current for the coil $b$ is obtained from the separate source of direct current through the switch 6. Between the segments 11 and 12 of the controller is arranged a resistance 13 to take up the field discharge when the circuit through the coil $b$ is broken. The resistance 13 is aided in this way by a high resistance 14 permanently connected across the coil $b$.

A non-inductive resistance 15 is connected in series with the resistance $b$. This resistance has an ohmic value several times as great as that of the field coil with which it is in series. The purpose of this resistance is to diminish the time constant of the field magnet $b$, for the time constant of a circuit is a function of its inductance divided by its resistance. Therefore by increasing the resistance of the field circuit without increasing the inductance, the current strength being kept the same, the time constant of the circuit is reduced. By this means quick reversals of the motor D may be more readily obtained.

The operation of the system is as follows:—The primary circuit of motor A is closed and the motor started by moving the bar 2 to cut out the starting resistance 1. The switch 4 is held open by its solenoid at this time because of the heavy current required for starting the motor. If desired, other means may be used to insure the open condition of this switch during starting. After the motor has gained sufficient speed and the starting resistance has been cut out, the solenoid switch is allowed to close to cut out resistance 3 because of the decrease in the primary current of motor A. The fly-wheel C and generator armature B are also started with the motor A, and the fly-wheel stores mechanical energy by its rotation. During this starting the arm $h$ is preferably in its vertical or "off" position. The switch 6 now being closed, the motor field $d$ is at its strongest, for it has none of the variable resistance 9 or 10 in circuit with it. The generator field $b$ is de-energized. The arm $h$ is now gradually moved from the vertical toward the horizontal in the proper direction to give the motor D the desired direction of rotation. As this arm moves, say counter-clockwise, it first connects the field coil $b$ in series with the direct current source and the armature B through the whole resistance 7, and then gradually cuts said resistance out of circuit. When the circuit of the field coil $b$ is completed the electromotive force of the generator armature B is negligible, and thus the direction of current from the direct current source determines the initial polarity of the generator field. If the desired direction of rotation of the motor D is the same as in its last previous operation, the current from the direct current source merely reinforces the residual magnetism of the generator field. If the desired direction of rotation of the motor D is the reverse of that of its last previous operation, the current from the direct current source reverses the residual magnetism of the generator field. In either case, as the generator B begins to build up, its electromotive force assists that of the direct current source to more strongly excite the generator field.

As the resistance 7 is cut out of circuit, the electromotive force of the armature B is increased. Continued movement of the arm $h$ toward the horizontal position also cuts the resistance 10 into the circuit of the motor field coil $d$, thus weakening the motor field to assist in increasing the speed of the motor D. The speed which the motor D acquires depends upon the extent of movement of the arm $h$, full speed being obtained when the full resistance 7 has been cut out and the full resistance 10 cut in. The relation between the electromotive forces of the separate direct current source and the generator B is preferably such that after the generator B has begun to pick up, the greater part of the excitation of the generator field is due to the electromotive force of the generator armature, thus making this generator practically fully self-excited.

If the load is heavy the working motor D requires more power for its starting than the motor A can furnish. The current rising in the primary of the transformer 5 by reason of this heavy load, the switch 4 is opened, thus inserting resistance 3 into the rotor circuit of motor A. This increases the slip of motor A and permits said motor to slow down, thus allowing the fly-wheel C to give up some of the mechanical energy it has stored, which energy helps the motor A to drive the generator B to supply electrical energy at the rate demanded by the motor D to drive the load.

As the arm $h$ is moved backward toward the vertical the field $d$ is strengthened and the field $b$ weakened. The latter causes the electromotive force of the armature B to decrease. Both the increasing of its field strength and the decreasing of the electromotive force impressed upon its armature slow down the motor D, causing it to act as a generator to supply current to the armature B, the latter now serving as a motor to help restore energy to the fly-wheel C. There is a powerful braking effect upon the working motor due to its acting as a generator. The diminished current in the primary of transformer 5 also causes the solenoid switch 4 to close, thereby increasing the speed of motor A so that the latter may also supply energy to the fly-wheel C. The fly-wheel thus stores up any excess of energy supplied when the rate of such supply exceeds the rate at which energy is demanded by the working motor, and gives up said stored energy whenever the rate of energy demanded is greater than the rate of energy supplied. When the arm $h$ disconnects the auxiliary source of direct current from the field coil $b$, the resistance 13 is connected in circuit with said coil $b$ to take the field discharge therefrom, the resistances 14 and 15 assisting in this. When the arm $h$ is moved clockwise from the vertical the above cycle is repeated, save that the working motor D rotates in the other direction because the direction of current in its armature is reversed.

I have described my invention in what I now consider to be its preferred form but many details in the precise arrangements shown and described may be varied without departing from the spirit and scope of my invention. All such obvious modifications I aim to cover in the claims.

What I claim as new is:—

1. The method of reversing the electromotive force of a generator, which consists in reversing the residual magnetism of its field magnet by current from a separate source and then energizing said field magnet mainly by self-excitation.

2. The method of varying the value and direction of the electromotive force of a generator which consists in energizing its field magnet from its armature and from a separate source of current in series, varying the resistance in its field circuit, and reversing the current supplied to the field magnet from the separate source of current when the electromotive force of the generator is less than that of the separate source.

3. The method of varying the value and direction of the electromotive force of a generator, which consists in energizing its field jointly from its armature and from a separate source of current, varying its field magnetism, and reversing the residual magnetism of its field magnet by current from the separate source when the electromotive force of the generator armature is at or near a minimum.

4. The method of reversing the electromotive force of an electric generator which consists in variably exciting the field magnet of the generator from its armature, and reversing the residual magnetism of said field magnet when the self-excitation thereof is at a minimum.

5. The method of controlling an electric generator which consists in determining the polarity of its field in either direction as desired by current from a separate source, and in further exciting its field by current from its own armature.

6. The method of controlling an electric motor which consists in supplying its armature from a generator, self-exciting the field of said generator, varying said excitation, and reversing the residual magnetism of the field magnet of said generator when said self-excitation is at or near a minimum.

7. The method of controlling an electric motor, which consists in supplying it from a generator, energizing the field of the generator jointly from its own armature and a separate source of current, varying the voltage of said generator, and reversing the current supplied to the generator field magnet from the separate source of current.

8. The method of reversing an electric motor, which consists in supplying it from a generator, self-exciting the field of said generator, varying said excitation, and reversing the residual magnetism of the field magnet of said generator by current from a separate source.

9. The method of controlling the speed and direction of an electric motor which consists in supplying the armature of said motor from the generator, energizing the field of the generator from its own armature and a separate source of current in series, varying the resistance of the generator field circuit, and reversing the current supplied to the generator field magnet from the separate source of current when the electromotive force of the generator is less than that of the separate source.

10. The method of controlling an electric motor which consists in supplying it from a generator, determining the polarity of the generator field by current from a separate source, further exciting said generator by current from its own armature, and varying such further excitation.

11. In a system of electrical distribution, a generator, a main circuit supplied thereby, a separate source of current, connections whereby the field magnet of said generator is energized jointly from its armature and from the separate source, and means for varying the field excitation of said generator and for reversing the current supplied to said field magnet from said separate source at a time when the generator field magnetization due to said separate source is greater than that due to the generator armature.

12. In combination, a self-excited generator, and means for varying the field excitation of said generator and for reversing the residual magnetism of said field magnet.

13. A system of electrical distribution, comprising a generator, a main circuit supplied thereby, a separate source of current, connections whereby the field magnet of the generator is supplied by the generator armature and said separate source of current in series, means for varying the field excitation of the generator, and means for reversing the current supplied to said generator field magnet by said separate source at the time the electromotive force of the main generator is less than that of the separate source.

14. In combination, a generator, a separate source of current, means for reversing the residual magnetism of the field of said generator by current from said separate source, and connections for energizing the generator field mainly from the generator armature.

15. A system of motor control, comprising a motor, a self-excited generator for supplying said motor, and means for varying the self-excitation of said generator and for reversing the residual magnetism of the field magnet of said generator when said self-excitation is at or near a minimum.

16. A system of motor control, comprising a motor, a generator for supplying said motor, a separate source of current, connections for supplying the field windings of said generator jointly from the generator armature and from the separate source of current, and means for varying said field excitation and for reversing the direction of the current supplied to said field windings by said separate source.

17. A system of motor control, comprising a motor, a generator for supplying the armature of said motor, a separate source of current, connections whereby the field of said motor is supplied by said separate source alone and the field of said generator by said separate source and the generator armature in series, and means for varying the strength of the motor field and the strength and polarity of the generator field.

18. A system of motor control, comprising a motor, a self-excited generator for supplying said motor, and means for varying the voltage of said generator and for reversing the residual magnetism of the field magnet of said generator.

19. A system of motor control, comprising a motor, a self-excited generator for supplying said motor, means for varying the voltage of said generator and for reversing the residual magnetism of the field magnet of said generator, and a resistance permanently connected across the generator field coil.

20. A system of motor control, comprising a motor, a self-excited generator for supplying said motor, means for varying the self-excitation of said generator and for reversing the residual magnetism of the generator field magnet, and a resistance permanently in series with the generator field coil.

21. A system of motor control, comprising a motor, a generator for supplying said motor, a separate source of current, connections for supplying the field windings of said generator jointly from the generator armature and the separate source of current, means for varying said field excitation and for reversing the direction of current supplied to said field windings by said separate source, and a resistance arranged to be connected in the field circuit of the generator as said separate source is disconnected therefrom.

22. A system of motor control, comprising a source of current, a motor supplied thereby, a generator driven by said motor, a second motor the armature of which is supplied by said generator, connections whereby the field of said generator is supplied jointly by the generator armature and another source of current, and means for varying the field excitation of said generator and for reversing the current supplied to said generator field magnet by said other source.

23. A system of motor control, comprising a source of current, a motor supplied thereby, a self-excited generator driven by said motor, a fly-wheel mechanically connected to said generator, a second motor supplied by said generator, means for varying the field magnetization of said generator and for reversing the residual magnetism of said generator field, and means for causing the first motor to drop in speed when the load thereon exceeds a predetermined value.

24. A system of motor control, comprising a source of current, a motor supplied thereby, a generator driven by said motor, a fly-wheel mechanically connected to said motor, a second motor the armature of which is supplied by said generator, connections whereby the field of said generator is excited by the generator armature and a separate source of current jointly, means for reversing the residual magnetism of said generator field magnet by reversing the current supplied thereto by said separate source, and means for causing said first motor to increase in speed when the load thereon falls below a predetermined value.

In testimony whereof I affix my signature, in the presence of two witnesses.

WILLIAM H. POWELL.

Witnesses:
GEO. B. SCHLEY,
FRED J. KINSEY.